Patented Aug. 22, 1944

2,356,689

UNITED STATES PATENT OFFICE 2,356,689

PURIFICATION OF ALCOHOLS

Rudolph J. Ozol, Hillside, and Christopher R. Masterson, Summit, N. J., assignors to Standard Alcohol Company No Drawing. Application May 28, 1941, Serial No. 395,626

9 Claims. (Cl. 202—57)

This invention relates to effecting an improvement in quality of aliphatic alcohols prepared by the hydration of hydrocarbons in the presence of sulfuric acid, and more particularly, it is concerned with the purification of the ethyl and isopropyl alcohols as prepared from petroleum refinery hydrocarbons in the presence of sulfuric acid.

The preparation of alcohols from petroleum refinery gases in the presence of sulfuric acid as a hydrating medium has for some time been well established. The various processes employed are the basis of an important industry. Purification of the product presents a process difficulty in the matter of removing offensive odors due to the presence of small quantities of impurities which are difficult to remove by physical and chemical means. These impurities occur as the result of the use of sulfuric acid and are presumably mixtures of complex hydrocarbon polymers formed from acetylene and diolefins and sulfur and oxygen-containing compounds of unknown composition. The present invention relates to a refining procedure whereby these impurities are removed, and it affords a means by which alcohols of good stability and odor can be advantageously prepared from alcohols produced by the treatment of refinery gases with sulfuric acid.

The invention consists in treating the impure or partly purified alcohol with solid cuprous chloride in amounts between 0.5% and 0.001% by weight of the alcohol at atmospheric or superatmospheric temperatures as a means of stabilizing and improving the odor of the alcohol. This treatment may be effected in a number of ways and upon either aqueous or substantially non-aqueous supplies of the impure alcohol of neutral or alkaline reaction. One way is to add the particular amount of cuprous chloride to the alcohol, usually after distillation has been made, to separate any content of high boiling impurities, and to agitate either by mechanical devices or circulation means the mixture for several minutes, then to allow the mixture to settle and thereafter separate the precipitated material either by decanting or filtering the supernatant alcohol layer. Another way is to pass the alcohol through cuprous chloride, or cuprous chloride admixed with an inert material such as clay, arranged in a packed column, or in beds in columns, or in porous plugs. The method of the invention is generally applicable to all the aliphatic alcohols prepared by the hydration of the corresponding hydrocarbons in the presence of sulfuric acid. The method, however, is particularly applicable to the relatively water-soluble aliphatic alcohols prepared from olefinic gases by treatment with sulfuric acid, namely, ethyl, the propyl, butyl and amyl alcohols.

This treatment with cuprous chloride to stabilize the alcohols is usually applied as a finishing process in the purification of alcohols; that is, either as a final treating step in a more comprehensive purification procedure or as a step immediately previous to the final distillation for the preparation of alcohols of a high degree of purity, stability and freedom from objectionable odors and colors. Thus, if the impure alcohol contains a large quantity of water, it may be advantageously to effect a partial dehydration by treating with about 5% of a strong caustic soda solution, generally of about 50% strength, removing the aqueous layer and then treating with the cuprous chloride. This step is often made a process feature in the preparation of substantially anhydrous alcohols because of the ease with which the degree of dehydration is effected without having an adverse effect, but in some cases, an advantageous effect, upon the subsequent treatment with cuprous chloride, especially in the treatment of the ethyl and isopropyl alcohols. The removal of water from the impure alcohol is not, however, necessary for advantageous treating with cuprous chloride unless the water is present in amounts over about 50%. Sometimes it is advantageous to add a small quantity of caustic soda solution after the treatment with cuprous chloride in order to increase the coagulation of the finely divided cuprous chloride and then to distill the decanted liquid.

This use of cuprous chloride for purifying and stabilizing alcohols prepared from olefins of the same number of carbon atoms by treatment with sulfuric acid is clearly distinguishable from prior art processes for the purification of alcohols. In the past the purification of alcohols has been effected by treating the alcohols with free chlorine and with compounds having the property of inducing oxidation in the presence of oxidizing substances, such as air and oxidizing agents, of the nature of the higher valent chemically active metal chlorides, of which mercuric chloride is a typical example.

In general, the processes employed in the prior art for purifying the alcohols have employed in one step of their procedure a compound or compounds having the capacity of oxidation or inducing oxidation. In no case, however, has this step been made the final treatment, since the particular compounds employed have definite solubilities in the alcohols and their action often results in oxidation products which must be removed by a subsequent treatment to eliminate these products and any excess reagents. The use of such treating agents has contributed to reduced yields of high quality products. Cuprous chloride, on the other hand, is insoluble in the alcohols and whatever action it does exert upon the alcohols, it is generally considered that little or no measure of oxidation of alcohol or impurities is involved. In fact, the method of the invention may be employed as the final purification step in the preparation of high grade alcohols. The cuprous chloride is used in the solid state and, therefore, separation from the treated product is usually relatively easy, that is, a matter merely of settling for a short period of time or the passing of the treated stock containing cuprous chloride through filters, especially after the addition in some cases of about 0.5% of caustic soda. In cases where caustic soda has not been employed the final distillation step may be omitted though it is not always advisable.

A clearer appreciation of the invention is conveyed by the following specific illustrations in regard to the treatment of isopropyl alcohol.

*Example 1*

To about 13,000 gallons of 91% isopropyl alcohol prepared by the hydration of propylene in the presence of sulfuric acid, 500 gallons of 50% aqueous caustic solution was added in a tank and agitated so as to effect partial dehydration. The aqueous caustic layer of about 35% strength was removed after diphase separation. The supernatant isopropyl alcohol after this treatment was of strength between 95% and 97.5%. To the thus treated alcohol 10 lbs. of cuprous chloride was added and the contents of the tank agitated by mechanical means for about 30 minutes, and then allowed to settle for two hours. The isopropyl alcohol after this treatment was subsequently distilled to remove dissolved caustic soda. The resultant isopropyl alcohol was of exceptionally good stability and odor.

*Example 2*

A 500 cc. sample of 91% isopropyl alcohol prepared by the hydration of propylene in the presence of sulfuric acid was agitated for five minutes at 20° C. with 2.5 grams of cupric chloride, the mixture allowed to settle and the supernatant liquid tested for odor. Another 500 cc. sample of the same 91% isopropyl alcohol was similarly treated, except that 2.5 grams of cuprous chloride was employed instead of the 2.5 grams of cupric chloride. The following data were obtained:

| Reagent | Treated alcohol | |
|---|---|---|
| | Color | Odor |
| Cupric chloride | Green tint | No improvement. |
| Cuprous chloride | Clear | Marked improvement. |

This comparison of data indicates that cupric chloride is unsatisfactory as a treating reagent for isopropyl alcohol as a means of improving the color and odor. In fact, long time contact with cupric chloride, especially at elevated temperatures, has been found to impart to the alcohol an undesirable odor which is extremely difficult to remove.

The nature of the impurities removed from the alcohol by the process of the invention, particularly those which impart undesirable odors, is not understood and the manner in which the cuprous chloride effects their removal or combats their effects is also not understood. It is believed, however, that the action of cuprous chloride is particular and specific. It is worthy of note in this regard that cuprous chloride is known to have a specific action as a catalyst in the conversion of acetylene type compounds and that many of these compounds are of malodorous character. It is known, for instance, that the malodorous compounds are present in the alcohols in extremely small proportions, that is, in amounts usually less than 0.05%. Similarly, the effect in stabilizing color is attributed to the effect of cuprous chloride upon substances present in very small quantities. No claim, however, is made as to the actual nature of the action of the cuprous chloride upon the alcohols in effecting the improved quality thereof. With the particular effect desired, the manner of processing, according to the invention, may be varied within the scope of the invention as determined by experimental investigation of small samples previous to large scale treating. Thus, with some crude supplies it may be particularly advantageous to effect the treatment with cuprous chloride by passing partially dehydrated alcohol through a tower containing the cuprous chloride admixed with inert materials such as clay; while in other cases mere agitation by mechanical means with a small quantity of cuprous chloride may be completely satisfactory. With such variation in procedure, the method of the invention is widely applicable to the purification of the alcohols derived from the treatment of olefin-containing materials with sulfuric acid and especially to the alcohols produced from petroleum refinery gases with sulfuric acid of which ethyl and isopropyl alcohols are representative products.

The foregoing descriptions of the invention and specific embodiments are for purposes of illustration and not of limitation. It is to be understood that the invention is not to be limited by any theory or illustration presented, but only by the following claims or their equivalent.

What is claimed is:

1. The method of stabilizing and improving the odor of an aliphatic alcohol prepared by the treatment of a corresponding olefin with sulfuric acid which comprises contacting the alcohol with small amounts of cuprous chloride.

2. The process of deodorizing alcohols obtained by the treatment of olefin hydrocarbons with sulfuric acid which comprises treating the malodorous alcohols with a small quantity of cuprous chloride and a small quantity of an aqueous concentrated caustic soda solution and then distilling.

3. The method of stabilizing and improving the odor of an aliphtaic alcohol prepared by the treatment of a corresponding olefin with sulfuric acid which comprises distilling the crude alcohol, treating the distillate with a small quantity of aqueous caustic soda, removing the aqueous phase, contacting the alcohol with a small quantity of cuprous chloride, removing the cuprous chloride, and distilling.

4. The method according to claim 2 in which the aliphatic alcohol is prepared from a petroleum refinery gas.

5. The method according to claim 2 in which the aliphatic alcohol is isopropyl alcohol prepared by the treatment of propylene with sulfuric acid.

6. A finishing process for an aliphatic alcohol derived from the corresponding olefin hydrocarbon by treatment with sulfuric acid which comprises distilling the impure alcohol to remove high boiling impurities, treating the distillate with a small quantity of a 50% aqueous caustic soda solution, removing the aqueous layer, contacting the alcohol with a small quantity of cuprous chloride and distilling the thus treated material.

7. A finishing process according to claim 6 in which the contacting of the alcohol with the cuprous chloride is effected by passing the alcohol through beds of cuprous chloride.

8. A finishing process according to claim 6 in which the contacting of the alcohol with the cuprous chloride is effected by agitating the cuprous chloride in the alcohol for several minutes.

9. A finishing process for the preparation of isopropyl alcohol of good stability and odor from impure isopropyl alcohol obtained by the treatment of propylene with sulfuric acid which comprises distilling the impure isopropyl alcohol to remove high boiling impurities, treating the distillate with about 5% of a 50% aqueous caustic soda solution, removing the aqueous layer, contacting the thus treated isopropyl alcohol with about 0.5% cuprous chloride and distilling the thus treated material.

RUDOLPH J. OZOL.
CHRISTOPHER R. MASTERSON.